(12) United States Patent
Zhou et al.

(10) Patent No.: US 8,944,348 B2
(45) Date of Patent: Feb. 3, 2015

(54) HANDHELD ELECTRIC SPRAY GUN

(75) Inventors: Haowei Zhou, Fenghua (CN); Lijun Huang, Fenghua (CN)

(73) Assignee: Fenghua Weilder Electric Appliance Co., Ltd., Ningbo, Zhejiang (CN)

( * ) Notice: Subject to any disclaimer, the term of this patent is extended or adjusted under 35 U.S.C. 154(b) by 10 days.

(21) Appl. No.: 13/978,559

(22) PCT Filed: Mar. 7, 2011

(86) PCT No.: PCT/CN2011/071594
§ 371 (c)(1),
(2), (4) Date: Jul. 8, 2013

(87) PCT Pub. No.: WO2012/094846
PCT Pub. Date: Jul. 19, 2012

(65) Prior Publication Data
US 2013/0277458 A1 Oct. 24, 2013

(30) Foreign Application Priority Data

Jan. 12, 2011 (CN) .......................... 2011 1 0005569

(51) Int. Cl.
| B05B 7/30 | (2006.01) |
| B05B 11/06 | (2006.01) |
| A62C 11/00 | (2006.01) |
| A01G 25/14 | (2006.01) |
| B05B 11/00 | (2006.01) |
| H02K 7/14 | (2006.01) |
| B05B 7/24 | (2006.01) |
| H02K 9/06 | (2006.01) |

(52) U.S. Cl.
CPC ............ *B05B 11/0002* (2013.01); *H02K 7/145* (2013.01); *B05B 7/2416* (2013.01); *B05B 7/2424* (2013.01); *H02K 9/06* (2013.01); *Y10S 239/14* (2013.01)
USPC .... 239/355; 239/351; 239/375; 239/DIG. 14; 222/401

(58) Field of Classification Search
USPC .................. 239/351, 355, 373, 375, DIG. 14; 222/401
See application file for complete search history.

(56) References Cited

U.S. PATENT DOCUMENTS

| 4,221,331 | A | * | 9/1980 | Goran, Jr. ..................... 239/121 |
| 4,301,971 | A | * | 11/1981 | Cornelius et al. ............. 239/351 |
| 4,693,423 | A | * | 9/1987 | Roe et al. ...................... 239/332 |
| 7,303,149 | B1 | * | 12/2007 | Huang .......................... 239/332 |
| 7,360,720 | B2 | * | 4/2008 | Gohring et al. ............... 239/351 |
| 7,478,766 | B2 | * | 1/2009 | Clarke et al. ................. 239/304 |
| 7,891,588 | B2 | * | 2/2011 | Jones et al. ................... 239/600 |
| 8,573,511 | B2 | * | 11/2013 | Sandahl ........................ 239/351 |
| 8,596,555 | B2 | * | 12/2013 | Thompson et al. ........... 239/332 |
| 2007/0252019 | A1 | * | 11/2007 | Peterson et al. .............. 239/337 |

\* cited by examiner

*Primary Examiner* — Ryan Reis
(74) *Attorney, Agent, or Firm* — Jackson IPG PLLC

(57) ABSTRACT

A handheld electric spray gun comprises a gun body, a spray can, a base for connecting the gun body with the spray can, and a housing. A nozzle is provided at the front end of the gun body. The upper portion of the housing is formed with a chamber, and the lower portion thereof is formed with a handle. The chamber is communicated with the gun body and provided with a motor therein. The handheld electric spray gun of the invention adopts a novel motor structure where a stator and rotor assembly is provided on the air-intake side of the blades, that is, the stator and rotor assembly is provided at the air inlet, so that the stator and rotor assembly may be forcibly cooled with cold air, thus the heat dissipation effect is greatly improved.

Figure 1:
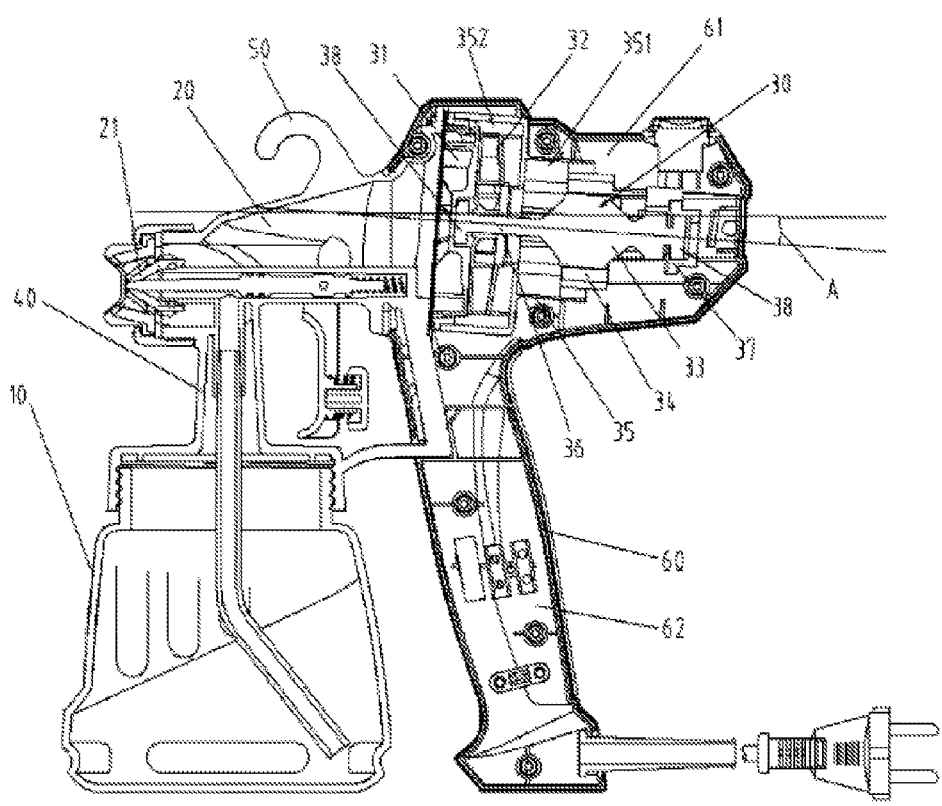

7 Claims, 2 Drawing Sheets

HANDHELD ELECTRIC SPRAY GUN

FIELD OF THE INVENTION

The invention relates to the technical field of spraying equipment, in particular to a handheld electric spray gun.

BACKGROUND OF THE INVENTION

Spray guns are common spraying equipment. Atomization for paint by spray guns may obtain aesthetic and uniform coatings on the surfaces of workpieces to be coated. The atomization effect of an atomization spray gun has a major impact on the aesthetics and uniformity of the surfaces of the workpieces to be coated.

In order to obtain uniform and aesthetic coatings of high requirements, in the prior art, the atomization requirement of paint is met generally by methods such as controlling the air flow rate and the spraying quantity of a spray gun and improving the mechanical structure of the sprayer of the spray gun. However, if the airflow rate and the pressure are increased to enhance the atomization strength, then the power of the motor needs to be increased. Provision of a high-power motor inside a spray gun on one hand occupies the space inside the spray gun, affects the aesthetics of the spray gun and increases the manufacture cost of the spray gun; and on the other hand, as the high-power motor is enclosed inside the spray gun, the heat of the motor generated when in service cannot be dissipated in time, such that the service life of the spray gun is affected.

SUMMARY OF THE INVENTION

On account of the insufficiencies of the prior art, the purpose of the invention is to provide a handheld spray gun with simple and compact structure and good motor heat-dissipation effect.

The invention adopts the following technical solution to achieve the above purpose.

The invention provides a handheld electric spray gun, comprising a gun body, a spray can, a base for connecting the gun body with the spray can and a housing. A nozzle is provided at the front end of the gun body. The upper portion of the housing is formed with a chamber, and the lower portion thereof is formed with a handle. The chamber is communicated with the gun body and provided with a motor therein. The motor comprises a motor shaft, a rotor and blades all sleeved on the motor shaft, a stator disposed correspondingly to the rotor, an air-outtake ring and a carbon brush bracket. The rotor is provided on the air-intake side of the blades. Two ends of the motor shaft are fixed with a bearing, respectively. Both the air-outtake ring and the carbon brush bracket are provided with a bearing seat, respectively. The bearing disposed on the air-outtake side of the blades is fixed in the bearing seat of the air-outtake ring, and the bearing disposed at the outer end of the rotor is fixed in the bearing seat of the carbon brush bracket. The air-outtake ring is disposed at a position where the chamber is connected with the gun body.

Further, the motor further comprises a wind-collecting cover, two ends of which are provided with a first accommodating chamber and a second accommodating chamber, respectively, the first accommodating chamber being communicated with the second accommodating chamber, with the blades disposed inside the second accommodating chamber and the stator disposed inside the first accommodating chamber.

Further, the air-outtake ring is provided thereon with a plurality of spiral air flues.

Further, the axis of the motor and the central axis of the chambers are disposed in a negative angle A which is 0°-30°, preferably, 0°-5°.

Further, the gun body is provided with a hook thereon.

Further, the housing is formed by a left housing and a right housing fixedly connected with each other.

The invention has the following advantages: the handheld electric spray gun of the invention adopts a novel motor structure where a stator and rotor assembly (the stator and the rotor) is disposed on the air-intake side of the blades, that is, the stator and rotor assembly is disposed at the air inlet, in this way, the stator and rotor assembly may be forcibly cooled with cold air, thus the heat dissipation effect is greatly improved. As a result, when the power of the motor is kept unchanged, the atomization effect is greatly enhanced, and the service life is greatly prolonged.

BRIEF DESCRIPTIONS OF THE DRAWINGS

Figure 2:
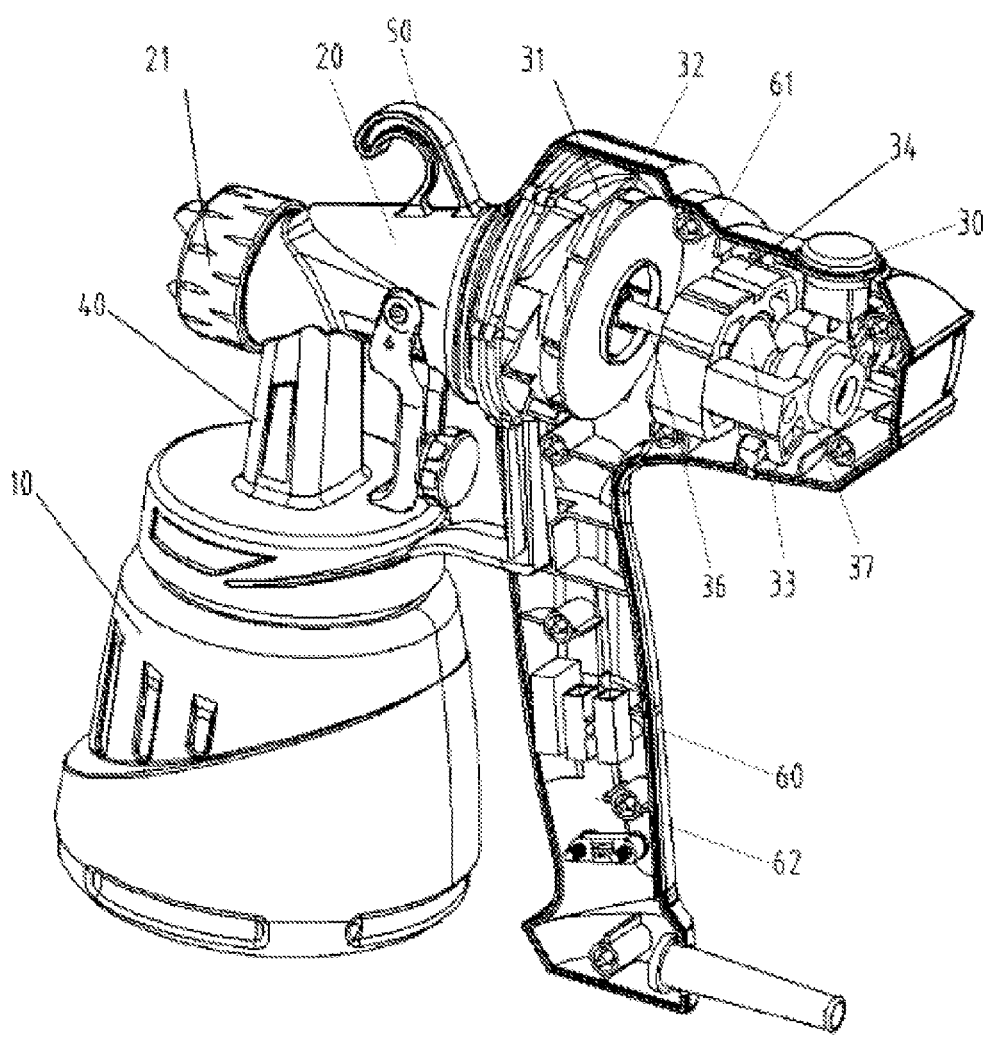

FIG. 1 is a sectional structure view of the invention; and,
FIG. 2 is a sectional structure view of the invention with the wind-collecting cover invisible.

DETAILED DESCRIPTIONS OF THE PREFERRED EMBODIMENTS

The invention will be further described with reference to drawings.

As shown in FIG. 1 and FIG. 2, the invention provides a handheld electric spray gun, comprising a gun body 20, a spray can 10, a base 40 for connecting the gun body 20 with the spray can 10 and a housing 60. The gun body 20, the base 40, the spray can 10 and the housing 60 constitute the basic structure of the invention. A nozzle 21 is provided at the front end of the gun body 20. The nozzle 21 is connected with the inner chamber of the spray can 10 through pipelines. The housing 60 is formed by a left housing and a right housing fixedly connected with each other. The upper portion of the housing 60 is formed with a chamber 61, and the lower portion thereof is formed with a handle 62. The chamber 61 is communicated with the gun body 20.

The chamber 61 is provided with a motor 30 therein. The motor 30 comprises a motor shaft 36, a rotor 33 and blades 32 all sleeved on the motor shaft 36, a stator 34 provided correspondingly to the rotor 33, an air-outtake ring 31 and a carbon brush bracket 37. The rotor 33 is provided on the air-intake side of the blades 32. Two ends of the motor shaft 36 are fixed with a bearing 38, respectively. Both the air-outtake ring 31 and the carbon brush bracket 37 are provided with a bearing seat, respectively. The bearing 38 disposed on the air-outtake side of the blades 32 is fixed in the bearing seat of the air-outtake ring 31 while the bearing 38 disposed at the outer end of the rotor 33 is fixed in the bearing seat of the carbon brush bracket 37. The air-outtake ring 31 is disposed at a position where the chamber 61 is connected with the gun body 20.

As a main innovation of the invention, the blades 32 are sleeved on the motor shaft 36. The rotor 33 is disposed on the air-intake side of the blades 32. Moreover, the stator 34 and the rotor 33 are disposed correspondingly, that is, a stator and rotor assembly (the stator 34 and the rotor 33) is disposed on the air-intake side of the blades 32. However, as for motors used in spray guns in the prior art, a stator and rotor assembly is generally disposed on the air-outtake side of the blades. Compared with the prior art, the motor 30 of the invention has better heat dissipation effect. The blades 32 can well pump heat generated during the working of the stator and rotor assembly (the stator 34 and the rotor 33) by cold air entering the electric spray gun, superior to heat dissipation by blowing by conventional motors.

As another main innovation of the invention, the motor 30 of the invention further comprises a wind-collecting cover 35, two ends of which are provided with a first accommodating chamber 351 and a second accommodating chamber 352, respectively, the first accommodating chamber 351 being communicated with the second accommodating chamber 352, with the blades 32 disposed in the second accommodating chamber 352 and the stator 34 disposed in the first accommodating chamber 351. The wind-collecting cover 35 of the invention has the function of collecting wind power, not only enhancing the air-intake and pumping effects of the blades 32, but also improving the air-outtake effect of the blades 32. When the power of the motor 30 is kept unchanged, the invention has better heat dissipation effect and air-outtake effect.

The air-outtake ring 31 is provided with a plurality of spiral air flues thereon, mainly for adjusting the direction of wind so that the nozzle 21 achieves better air spraying effect.

The axis of the motor and the central axis of the chamber 61 are disposed in a negative angle A which is 0°-30°, preferably, 0°-5°. With such arrangement, the structure of the invention is more compact, and it is more convenient for handholding the handle 62.

The gun body 20 is provided with a hook 50 thereon, for hooking the electrical spray gun conveniently, thereby effectively saving the storage space.

The handheld electric spray gun of the invention adopts a novel structure of the motor 30 where a stator and rotor assembly (the stator 34 and the rotor 33) is disposed on the air-intake side of the blades 32, that is, the stator and rotor assembly is disposed at the air inlet, in this way, the stator and rotor assembly may be forcibly cooled with cold air, thus the heat dissipation effect is greatly improved. As a result, when the power of the motor is kept unchanged, the atomization effect is greatly enhanced, and the service life is greatly prolonged.

The above contents just describe preferable embodiments of the invention. Therefore, equivalent variations or modifications made based on the constructions, features and principles within the patent application scope of the invention should be included within the patent application scope of the invention.

What is claimed is:

1. A handheld electric spray gun, comprising a gun body (20), a spray can (10), a base (40) for connecting the gun body (20) with the spray can (10) and a housing (60), a nozzle (21) being provided at the front end of the gun body (20), the upper portion of the housing (60) being formed with a chamber (61) and the lower portion thereof being formed with a handle (62), the chamber (61) being communicated with the gun body (20), wherein the chamber (61) is provided with a motor (30) therein, the motor (30) comprising a motor shaft (36), a rotor (33) and blades (32) all sleeved on the motor shaft (36), a stator (34) provided correspondingly to the rotor (33), an air-outtake ring (31) and a carbon brush bracket (37); the rotor (33) is provided on the air-intake side of the blades (32), two ends of the motor shaft (36) are fixed with a bearing (38), respectively, both the air-outtake ring (31) and the carbon brush bracket (37) are provided with a bearing seat, respectively, and the bearing (38) disposed on the air-outtake side of the blades (32) is fixed in the bearing seat of the air-outtake ring (31) while the bearing (38) disposed at the outer end of the rotor (33) is fixed in the bearing seat of the carbon brush bracket (37); and the air-outtake ring (31) is disposed at a position where the chamber (61) is connected with the gun body (20).

2. The handheld electric spray gun according to claim 1, wherein the motor (30) further comprises a wind-collecting cover (35), two ends of which are provided with a first accommodating chamber (351) and a second accommodating chamber (352), respectively, the first accommodating chamber (351) being communicated with the second accommodating chamber (352), with the blades (32) disposed in the second accommodating chamber (352) and the stator (34) disposed in the first accommodating chamber (351).

3. The handheld electric spray gun according to claim 2, wherein the air-outtake ring (31) is provided with a plurality of spiral air flues thereon.

4. The handheld electric spray gun according to any one of claims 1 to 3, wherein the axis of the motor and the central axis of the chamber (61) are disposed in a negative angle A which is 0°-30°.

5. The handheld electric spray gun according to claim 4, wherein the angle is 0°-5°.

6. The handheld electric spray gun according to claim 4, wherein the gun body (20) is provided with a hook (50) thereon.

7. The handheld electric spray gun according to claim 4, wherein the housing (60) is formed by a left housing and a right housing fixedly connected with each other.

* * * * *